United States Patent [19]

McAvoy

[11] 4,004,761
[45] Jan. 25, 1977

[54] OUTRIGGER AIR CUSHION LANDING SYSTEM

[75] Inventor: John Jerome McAvoy, Seattle, Wash.

[73] Assignee: The Boeing Company, Seattle, Wash.

[22] Filed: May 10, 1976

[21] Appl. No.: 684,801

[52] U.S. Cl. .................. 244/100 A; 244/102 R
[51] Int. Cl.² .................................. B60V 3/08
[58] Field of Search ........ 244/102 R, 100 A, 100 R, 244/105; 180/116, 117, 124, 127

[56] References Cited

UNITED STATES PATENTS

| | | | |
|---|---|---|---|
| 2,463,351 | 3/1949 | Bowers | 244/102 R |
| 3,165,280 | 1/1965 | Lee | 244/102 R X |
| 3,524,517 | 8/1970 | La Fleur | 180/124 |

Primary Examiner—Trygve M. Blix
Assistant Examiner—Barry L. Kelmachter
Attorney, Agent, or Firm—Mark J. Zovko, Jr.

[57] ABSTRACT

An air cushion landing system for an aircraft. The landing system has an air cushion assembly which is stored in the fuselage of the aircraft during cruise and which extends for landing. The assembly consists of a rigid arm with two folding portions, inflatable bags attached to the underside of the arm, and flaps to define an area of cushion air. The inflatable bags provide primary attenuation of landing impact. Actuators are provided to retract the assembly following takeoff and extend it for landing.

4 Claims, 10 Drawing Figures

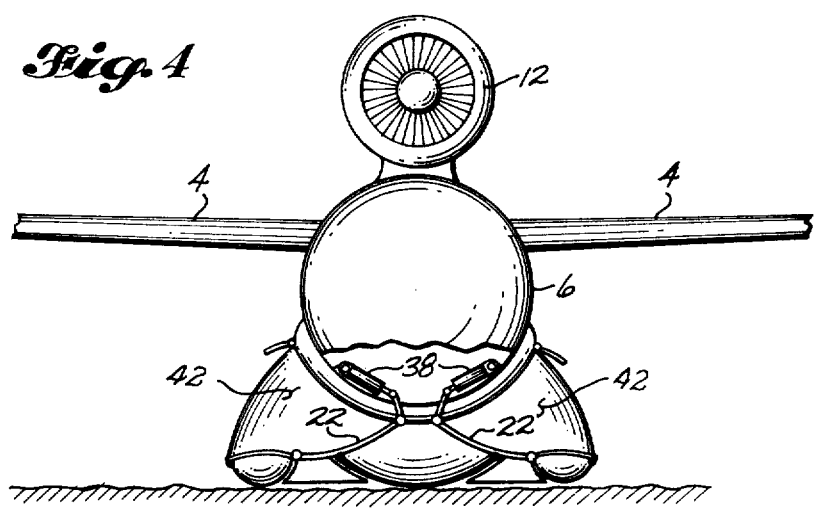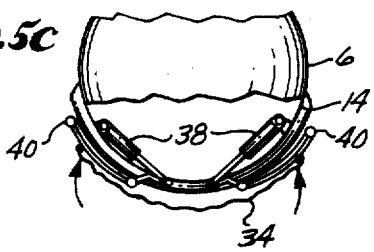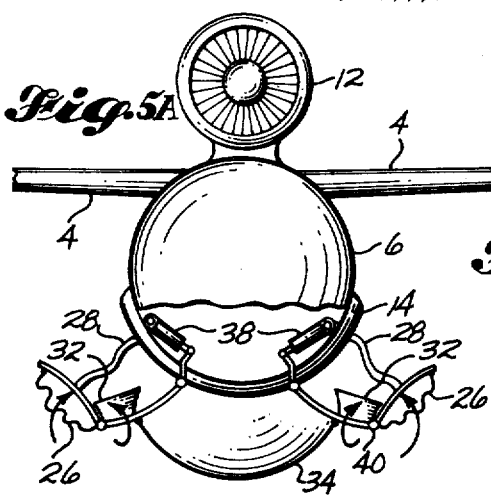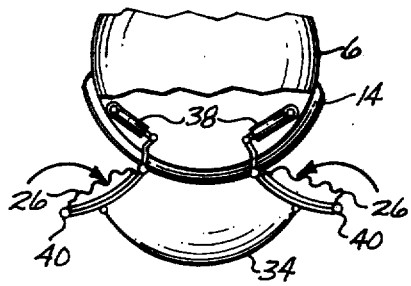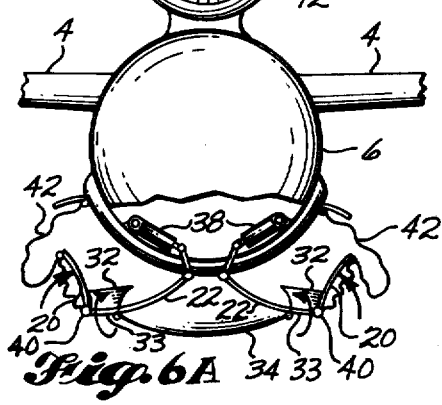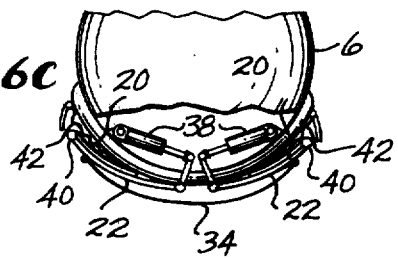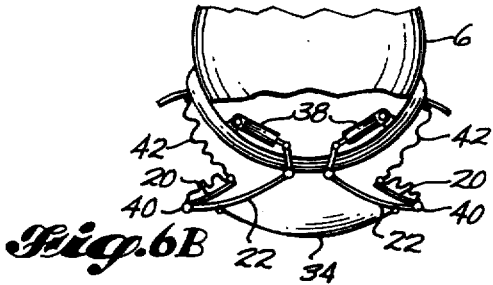

| U.S. Patent No. | Classification | Inventor |
|---|---|---|
| BR 1,089,464 | 180/127 | Rowland Hunt |

OUTRIGGER AIR CUSHION LANDING SYSTEM

The invention described herein may be manufactured and used by or for the Government of the United States of America for governmental purposes without the payment of any royalties thereon or therefor.

BACKGROUND OF THE INVENTION

1. Field of the Invention

This disclosure relates in general to a landing system for aircraft, and more particularly to a retractable air cushion landing system for aircraft.

2. Description of the Prior Art

It is already known in the prior art to provide a cushioned landing system for certain aircraft using inflatable air bags. Present air cushion landing system concepts consist of providing an air bag shaped like an elongated donut. This air bag is commonly called the trunk. The trunk of the air cushioned landing system is usually inflated and provides a skirt to contain air pressure between the ground and the aircraft fuselage. The trunk also functions to attenuate landing impact of the aircraft at the time of touchdown.

The main difficulty with the above described system which includes an impact absorbing trunk concerns retraction of the trunk after takeoff of the aircraft.

For remotely piloted vehicles, the problem has been avoided by utilizing two trunks — one for takeoff, and an alternate or spare trunk for recovery of the aircraft. In this dual trunk system, a remotely piloted vehicle will lift off with the recovery trunk folded and stored in a bag beneath the takeoff trunk. After lift off, the takeoff trunk is dropped from the aircraft. When the remotely piloted vehicle lands, the recovery trunk is inflated from engine bleed air lines, and "pops out" of the bag which had previously contained it during takeoff and cruise. After landing is accomplished, the recovery trunk is replaced by hand folding. The present invention concerns a novel system which facilitates retraction of the air cushion bags and has other advantages that will be apparent forthwith.

Other attempts to solve the problem of retraction of the air cushion landing system includes using an elastic trunk. The purpose in using an elastic trunk is to facilitate storing of the trunk when it is not in use. When the trunk is not in use it remains unpressurized and deflated, and is contracted against the fuselage of the aircraft. Many difficulties arise, however, from the use of elastic trunks. The elastic trunks are relatively expensive and also cause various dynamic problems during operation of the aircraft.

Other retraction systems in the prior art for retracting the trunk portion of an air cushion landing system require a large volume for trunk storage and involve a complex web of cables and pulleys for retraction.

A novelty search of the prior art relating to air cushion landing systems discovered the following U.S. Patents:

| U.S. Patent No. | Classification | Inventor |
|---|---|---|
| 2,944,771 | 244/100 | O. J. Bush |
| 3,258,080 | 180/127 | G.H. Williams, et.al. |
| 3,297,280 | 180/116 | Shao-Tang LEE |
| 3,384,197 | 180/117 | A.E. Bingham, et.al. |
| 3,802,602 | 244/100 | F.W. Wilson |
| 3,826,449 | 244/100 | Nelson, et.al. |
| 3,865,332 | 244/100 | A.V. Coles |
| 3,869,103 | 180/124 | Nelson, et.al. |

Also, one British patent was discovered:

A close approach to the proposed construction of the present invention was not observed in the above cited patents. Perhaps of most merit are U.S. Pat. Nos. 3,869,103, 3,258,080 and British Pat. No. 1,089,464. U.S. Pat. No. 3,869,103 describes a system for retracting the "elongated donut" trunk. This system, however, requires a relatively complex array of cables and pulleys which are not needed in the present invention. U.S. Pat. No. 3,258,080 and British Pat. No. 1,089,464 show rigid pivoted structures and air bag means employed in various arrangements. In these patents, however, the simplicity and effectiveness inherent in the present invention is lacking.

SUMMARY OF THE INVENTION

The present invention provides an air cushion landing system which includes a pair of rigid arms having a first and second portion. The first portions of the rigid arms are mounted to the fuselage of the aircraft toward its underside. The second portions of the rigid arms are mounted to the ends of the first portions of the rigid arms. A first pair of inflatable bags is sealably mounted to the underside of each rigid arm. A second inflatable bag is located under the center of the body of the aircraft. Flaps are provided between the first and second inflatable bags at each end of the assembly. The inflatable bags can be inflated from engine bleed air and serve to cushion the aircraft at landing. An actuating system is provided which retracts or extends the first and second portions of the rigid arms. Preferably, the actuating system consists of a rotary gear or hydraulic actuator connected to appropriate linkage to the rigid arms so that the first and second portions of the rigid arms may be folded in upon each other after the inflatable bags are deflated. The rigid arms and inflatable bags can then be stored compactly along the side of the aircraft in provided containment spaces. The first and second portions of the rigid arms are locked in place by locking hinges. Along with the inflatable bags mounted to the underside of the rigid arms, a second pair of inflatable bags to further cushion the landing of the aircraft may be sealably mounted to the top side of the rigid arms and the aircraft fuselage. This second pair of inflatable bags would deflate and compactly fold into the containment space for the system during cruise operation of the aircraft.

The inflatable air bags may be made to extend along the side of the aircraft for some length. Storage of the bags and arms would be accomplished using the retracting and extension system described herein.

Accordingly, it is the object of the present invention to provide an air cushion landing system for an aircraft which effectively cushions landing of the aircraft using inflatable bags which can be compactly stored in the fuselage of the aircraft.

A further object of the present invention is to provide an air cushion landing system for an aircraft which has a relatively simple yet effective retraction and extension system.

Another object of the present invention is to provide an air cushion landing system for an aircraft which can assist the recovery of remotely piloted aircraft on soft terrain or unimproved runways.

Still another object of the present invention is to provide an air cushion landing system for an aircraft which requires a relatively small volume for inflatable bag storage.

Another object of the present invention is to provide an air cushion landing system for an aircraft which has means to contain air pressure between the aircraft and the ground, resulting, therefore, in a cushioning effect upon taxi and takeoff.

These and other objects and advantages of the present invention will become more apparent from the following detailed description when taken in conjunction with the attached drawings.

BRIEF DESCRIPTION OF THE DRAWINGS

FIG. 4 is a front view of a remotely piloted vehicle showing the air cushion landing assembly of the present invention including a pair of secondary air bags.

FIG. 5A is a front view of a remotely piloted vehicle showing the air cushion landing assembly of the present invention in the first stage of retraction.

FIG. 5B is a front view of a remotely piloted vehicle showing the air cushion assembly of the present invention in the second stage of retraction.

FIG. 5C is a front view of a remotely piloted vehicle showing the air cushion assembly of the present invention in the third stage of retraction.

FIG. 6A is a front view of a remotely piloted vehicle showing the air cushion assembly of the present invention, including secondary air bags, in the first stage of retraction.

FIG. 6B is a front view of a remotely piloted vehicle showing the air cushion assembly of the present invention, including secondary air bags, in the second stage of retraction.

FIG. 6C is a front view of a remotely piloted vehicle showing the air cushion assembly of the present invention, including secondary air bags, in the second stage of retraction.

DESCRIPTION OF THE PREFERRED EMBODIMENT

Figure 1:
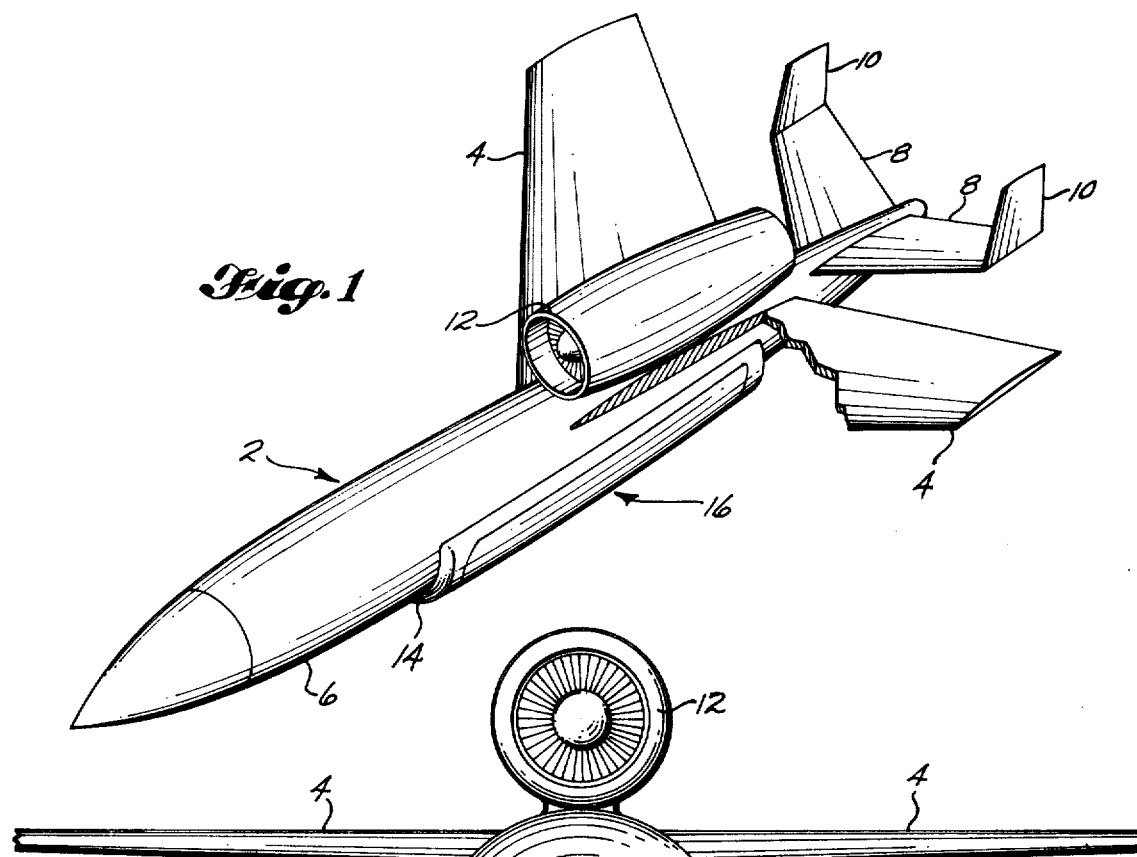
FIG. 1 is an isometric view of a remotely piloted vehicle showing the air cushion landing assembly of the present invention retracted.
Figure 2:
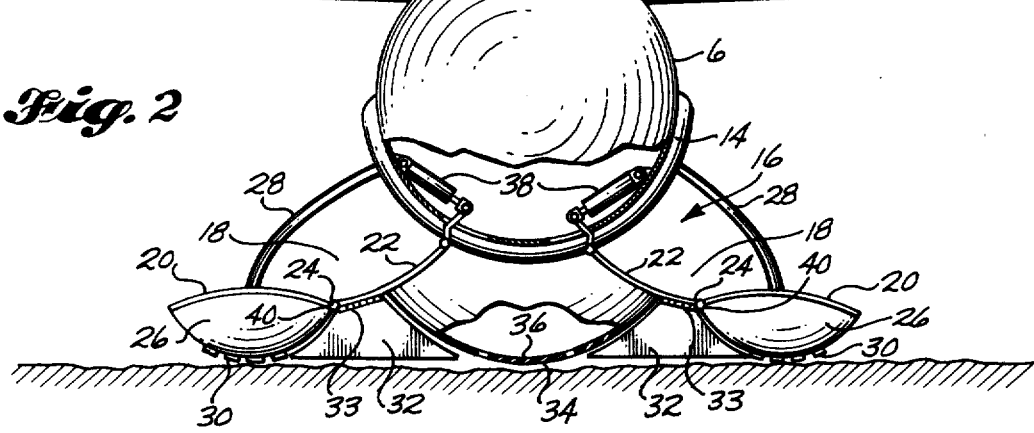
FIG. 2 is a front view of a remotely piloted vehicle showing the air cushion landing assembly of the present invention extended.

Referring to FIGS. 1 and 2, a remotely piloted vehicle generally designated as 2 is shown. The vehicle 2 has wings 4 mounted to a fuselage 6. At the aft end of the vehicle 2, stabilizing fins 8 are located. A pair of vertical stabilizers 10 are attached to fins 8. Mounted on the top of the fuselage 6 is engine 12 which is used to propel the vehicle 2.

Located in fuselage 6 is a compartment 14 which houses the air cushion assembly, generally designated as 16, which cushions landing of the vehicle 2. The air cushion assembly 16 is shown in its extended position in FIG. 2 used for landing of the vehicle 2.

Referring to FIG. 2, a more detailed view of air cushion assembly 16 is shown. Assembly 16 consists in part of a pair of rigid arms generally designated as 18. Arms 18 are symmetrical and the following description will be for only one arm. The other arm is alike in all its mechanical and operational aspects. Arm 18 is divided into two portions: a fore portion 20, an aft portion 22. Aft portion 22 of rigid arm 18 is mounted to the fuselage 6 of the vehicle 2 by suitable mounting means (not shown). The aft portion 22 of the rigid arm 18 is then connected by suitable connecting means to the fore portion 20. The connecting means 24 are constructed so that the two portions of rigid arm 18 may be folded one upon the other.

Mounted in a sealed fashion to the underside of rigid arm 18 is inflatable bag 26. Inflatable bag 26 is inflated for landing purposes via duct 28 from a source (not shown) located within remotely piloted vehicle 2. The underside of inflatable bag 26 has suitable tread 30 such as standard rubber tire tread to reduce wear on the bag 26 during landing. Inflatable bags 26 may be inflated with any suitable gas, such as air, nitrogen or an inert gas.

Figure 3:
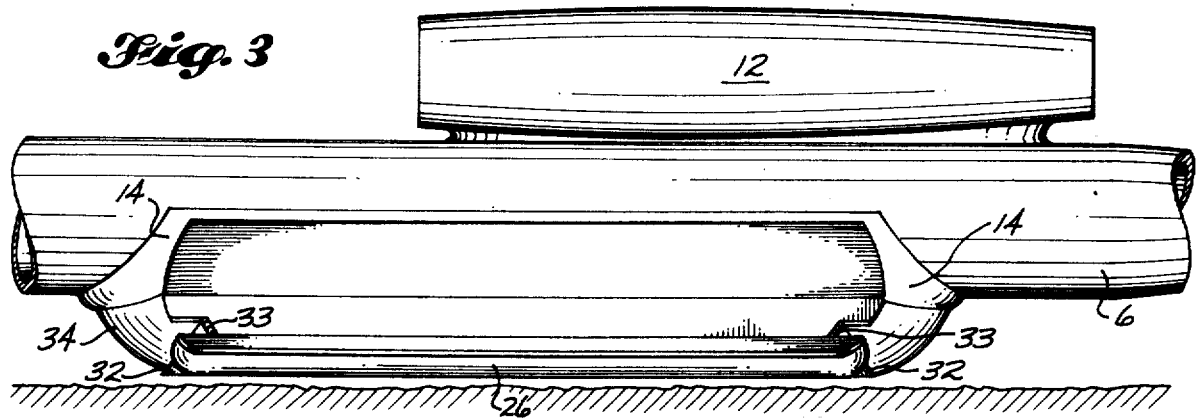
FIG. 3 is a side view of a remotely piloted vehicle showing the air cushion assembly of the present invention extended for landing.

A flap means 32 is mounted on the underside of the aft portion 22 of rigid arm 18. Flap means 32 may be inflatable, and made of material similar to bag 26. The flap means 32 is located on each end of the air cushion assembly 16 as seen best in FIG. 3. In this case the rearward flap means would be mounted to the underside of a rigid arm (not shown) located at the rear of assembly 16. The rearward rigid arm would in all respects be similar to the arm 18 shown in FIG. 2. Actuator 33 mounted to the aft portion 22 of rigid arm 18 is provided to rotate flap means 32 during the extension and retraction of assembly 16.

A center body inflatable bag 34 is mounted in a sealable fashion to the underside of the aft portion 22 of rigid arm 18, adjacent to the flap means 32. The center body inflatable bag 34 may be inflated from a source (not shown) located in the fuselage 6 of the aircraft. Bag 34 provides primary attenuation of the aircraft upon landing. A plurality of holes 36 are located along the center line of bag 34. The holes 36 allow gas to escape from bag 36, and form a fluid cushion bounded by the outside bags 26 and the flap means 32 during landing. The cushion provided thus smooths the landing of the aircraft to a greater degree relative to a simple inflatable bag system without the cushion feature.

Actuator 38 is provided to extend and retract the assembly 16. Actuator 38 is attached to rigid arm 18, preferably to the aft portion 22, as shown in FIG. 2 and serves to initiate and complete extension and retraction of the cushion assembly 16. Actuator 38 may be a standard hydraulic actuator or a rotary gear driven actuator. Actuator 38 is connected to a power source (not shown) which causes actuation of its moving parts.

To facilitate extension and retraction of the fore portion 20 of rigid arm 18, a second actuator 40 may be provided. The actuator is preferably a rotary gear actuator located at the point where the fore and aft portion of rigid arm 18 meet. The rotary gear actuator would be capable of rotating the fore portion 20 relative to the aft portion 22 of arm 18.

Referring to FIGS. 5A, 5B, and 5C, the retraction of the cushion assembly 16 is shown in three stages. In FIG. 5A, inflatable bags 26 have been deflated, along with flap means 32. The fore portion 20 of rigid arm 18 is rotated upwardly by rotary actuator 40. Flap means 32 are also rotated upwardly over the aft portion 22 of rigid arm 18 by actuator 33. FIG. 5B shows the second stage of retraction in which the fore portion 20 or rigid arm 18 is completely folded over the aft portion 22. At this point the center body inflatable bag 34 is deflated slightly. The final step in retracting the assembly consists of activating actuator 38 which folds the rigid arm up into compartment 14. The center body inflatable bag 34 is stretched across the underside of the fuselage 6.

The cushion assembly 16 is extended in the reverse sequence relative to its retraction. Actuator 38 is actuated to produce a rotation of the rigid arm 18. Actuator 40 then is activated producing a rotation of the fore portion 20 of rigid arm 18 relative to the aft portion 20 until the fore and aft portion of rigid arm 18 are aligned. Flap means 32 is then rotated downward into position by actuator 33. At this point inflatable bags 26 and 34 are inflated, and if flap means 32 is inflatable, it is also inflated.

Assuming the aircraft is in normal cruise operation and desires to land, the cushion assembly 16 is extended as described above. The initial impact is attenuated primarily by the center body inflatable bag 34. The inflatable bags 26 serve to attentuate the initial impact in a lesser degree. After initial impact, gas is allowed to escape from the center body bag 34 via holes 36. The flap means 32 and inflatable bags 26 form a boundary for the gas escaping from bag 34 and due to the pressure on the ground from the escaping gas form a gas cushion which smooths the landing of the vehicle. Tread 30 provided on bags 26 reduces the wear on these bags. Eventually the vehicle decelerates to a very low ground speed due to the friction acting on the vehicle. At this point holes 36 may be closed and the vehicle completely stopped by both the center body and bag 34 and bag 30 contacting the ground.

The above description describes only one embodiment of the invention, and many other embodiments of the invention may be contemplated without departing from the scope of the inventive concept.

One alternative to the embodiment described above is shown in FIG. 4. In this embodiment the assembly 16 has an additional set of secondary inflatable bags 42. Bags 42 provide additional attenuation upon impact and serve to further stabilize the entire assembly during the cushioned landing.

FIGS. 6A, 6B, and 6C show the retraction of the assembly 16 with the addition of secondary bags 42. As shown in FIG. 6A inflatable bags 26 have been deflated along with flap means 32. Secondary inflatable bags 42 are also beginning to be deflated. The fore portion 20 of rigid arm 18 is rotated upwardly by rotary actuator 40. Flap means 32 is also rotated upwardly over the aft portion 22 of rigid arm 18 by actuator 33.

FIG. 6B shows the second stage of retraction in which the fore portion 20 of rigid arm 18 is completely folded over the aft portion 22. At this point the center body bag is deflated slightly. The final step in retracting the assembly is activating actuator 38 which folds the rigid arm up into compartment 14. The center body bag 34 is stretched across the underside of the fuselage 6. Secondary bag 42 is folded up with the rigid arm portions.

The cushion assembly 16 with secondary bags 42 is extended in the reverse sequence relative to its retraction. Actuator 38 is actuated to produce a rotation of the rigid arm 18. Actuator 40 then is activated, producing a rotation of the fore portion 20 of rigid arm 18 relative to the aft portion 20 until the fore and aft portions of rigid arm 18 are aligned. Flap means 32 is then rotated downwardly into position by actuator 33. At this point inflatable bags 26, 34, and 42 are inflated. Flap means 32 also is inflated if it is of an inflatable construction.

Although a couple of arrangements of the invention have been illustrated above by way of example, it is not intended that the invention be limited thereto. Accordingly, the invention should be considered to include any and all modifications, alterations or equivalent arrangements falling within the scope of the annexed claims.

Having thus described the invention, what is claimed is:

1. An air cushion landing system for an aircraft having a fuselage comprising:
   a. rigid member means having a first and second portion, the first portion mounted to the fuselage of the aircraft, and the second portion mounted to the first portion of said rigid member means;
   b. first inflatable bag means sealably mounted to the underside of the second portion of said rigid member means;
   c. second inflatable bag means sealably mounted to the underside of the first portion of said rigid member means;
   d. flap means mounted to the underside of the first portion of said rigid member means for containing a volume of air between said flap means and said first and second inflatable bag means;
   e. inflating means for inflating said first and second inflatable bag means whereby said first and second inflatable bag means cushion the aircraft at landing;
   f. actuating means connected to the aircraft and to said rigid member means for extending said rigid member means and said first and second inflatable bag means during landing and retracting said rigid member means and said first and second inflatable bag means during cruise operation.

2. The combination of claim 1 which concludes third inflatable bag means sealably mounted to the top side of said rigid member means and the fuselage of the aircraft.

3. The combination of claim 1 wherein said second inflatable bag means has holes on the underside of the bag means to provide air leakage therethrough so that the aircraft is cushioned by a layer of air at landing.

4. The combination of claim 1 which includes containment means for containing said rigid member means and said first and second inflatable bag means during cruise operation.

* * * * *